US011883346B2

(12) United States Patent
Schroeder et al.

(10) Patent No.: US 11,883,346 B2
(45) Date of Patent: *Jan. 30, 2024

(54) WALKING DEVICE WITH PICK UP MECHANISM

(71) Applicants: Gary L. Schroeder, Davis, CA (US); Frank Sivo, Boca Raton, FL (US); Wang Su, Livingston, NJ (US)

(72) Inventors: Gary L. Schroeder, Davis, CA (US); Frank Sivo, Boca Raton, FL (US); Wang Su, Livingston, NJ (US)

(73) Assignees: Gary L. Schroeder, Davis, CA (US); Frank Sivo, Boca Raton, FL (US); Wang Su, Livingston, NJ (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/445,091

(22) Filed: Aug. 16, 2021

(65) Prior Publication Data

US 2023/0046968 A1 Feb. 16, 2023

(51) Int. Cl.
*A61H 3/00* (2006.01)
*A45B 9/00* (2006.01)
*A61H 3/02* (2006.01)

(52) U.S. Cl.
CPC .......... *A61H 3/00* (2013.01); *A45B 2009/002* (2013.01); *A61H 3/0244* (2013.01); *A61H 2003/0272* (2013.01); *A61H 2201/1215* (2013.01); *A61H 2201/5064* (2013.01)

(58) Field of Classification Search
None
See application file for complete search history.

(56) References Cited

U.S. PATENT DOCUMENTS

| | | | |
|---|---|---|---|
| 1,270,973 | A | 7/1918 | Rosenwasser |
| 3,029,828 | A | 4/1962 | Kravitt |
| 3,158,851 | A | 11/1964 | Ruthven |
| 4,071,152 | A | 1/1978 | Kinkead et al. |

(Continued)

FOREIGN PATENT DOCUMENTS

| | | | |
|---|---|---|---|
| DE | 609945 | C | 2/1935 |
| FR | 1016156 | A | 11/1952 |

(Continued)

OTHER PUBLICATIONS

International Search Report in PCT/US2020/045858 dated Dec. 7, 2020, 2 pages.

(Continued)

*Primary Examiner* — David R Dunn
*Assistant Examiner* — Danielle Jackson
(74) *Attorney, Agent, or Firm* — METIS IP LLC

(57) ABSTRACT

An improved walking device is disclosed wherein the device comprises an elongated body, a movable arm coupled to the elongated body, a power source connector, a first sensor, a releaser, a first spring, wherein the first sensor is capable of detecting an orientation of the device and producing an electronic signal based on the orientation, wherein the electronic signal is capable of at least partially causing a movement of the releaser, wherein the releaser is capable of nudging the movable arm away from a resting position, and wherein the first spring is capable of causing the movable arm to rotate to a deployed position.

10 Claims, 10 Drawing Sheets

(56) References Cited

U.S. PATENT DOCUMENTS

| | | | |
|---|---|---|---|
| 4,091,828 | A | 5/1978 | Jorgensen |
| 4,121,605 | A | 10/1978 | Schmerl |
| 4,184,380 | A | 1/1980 | Rivin |
| 4,237,915 | A | 12/1980 | Zabielski et al. |
| 4,358,138 | A | 11/1982 | Laughlin et al. |
| 4,811,750 | A | 3/1989 | McAllister |
| 4,884,730 | A | 12/1989 | Carpenter |
| RE33,675 | E | 8/1991 | Young |
| 5,176,160 | A | 1/1993 | Osborn |
| 5,259,236 | A | 11/1993 | English |
| 5,331,990 | A | 7/1994 | Hall et al. |
| 5,433,234 | A | 7/1995 | Lapere |
| 5,477,211 | A | 12/1995 | Reynolds |
| 5,554,975 | A | 9/1996 | Hall et al. |
| 5,755,245 | A | 5/1998 | Van Helvoort |
| 5,794,639 | A | 8/1998 | Einbinder |
| 5,826,605 | A | 10/1998 | Hilton |
| 5,853,219 | A | 12/1998 | Santuccio |
| 5,862,824 | A | 1/1999 | Herman |
| 6,039,064 | A | 3/2000 | Hilton |
| 6,055,997 | A | 5/2000 | Greenstadt et al. |
| 6,068,007 | A | 5/2000 | Hilton |
| 6,163,249 | A | 12/2000 | Betcher, III |
| 6,330,888 | B1 | 12/2001 | Aravantinos et al. |
| 6,392,556 | B2 | 5/2002 | Tomich |
| 6,666,796 | B1 | 12/2003 | MacCready, Jr. |
| 6,745,786 | B1 | 6/2004 | Davis |
| 6,864,796 | B2 | 3/2005 | Lehrman et al. |
| 7,265,680 | B2 | 9/2007 | Igami et al. |
| 7,398,791 | B2 | 7/2008 | Tucker |
| 7,637,273 | B1 | 12/2009 | Lisenby |
| 8,387,638 | B2 | 3/2013 | Schroeder et al. |
| 8,490,637 | B2 | 7/2013 | Schroeder et al. |
| 8,689,811 | B2 | 4/2014 | Schroeder et al. |
| 11,116,294 | B2 * | 9/2021 | Schroeder ................ A45B 3/00 |
| 2004/0144410 | A1 | 7/2004 | Cheng et al. |
| 2006/0129308 | A1 | 6/2006 | Kates |
| 2006/0206167 | A1 | 9/2006 | Flaherty et al. |
| 2008/0072942 | A1 | 3/2008 | Warren |
| 2009/0038664 | A1 | 2/2009 | Juslin et al. |
| 2011/0203626 | A1 * | 8/2011 | Schroeder .............. G05B 15/02 340/3.1 |
| 2011/0203627 | A1 * | 8/2011 | Schroeder ................ A45B 9/00 700/275 |
| 2012/0215355 | A1 | 8/2012 | Bewley et al. |
| 2013/0274927 | A1 * | 10/2013 | Schroeder ................ A61H 3/02 700/275 |
| 2020/0197254 | A1 | 6/2020 | Dehler |
| 2021/0045508 | A1 | 2/2021 | Schroeder et al. |

FOREIGN PATENT DOCUMENTS

| | | | |
|---|---|---|---|
| GB | 868541 | A | 5/1961 |
| KR | 101711300 | B1 | 2/2017 |
| WO | 2018215819 | A1 | 11/2018 |

OTHER PUBLICATIONS

Written Opinion in PCT/US2020/045858 dated Dec. 7, 2020, 4 pages.

International Search Report in PCT/US2011/000264 dated Apr. 19, 2011, 3 pages.

Written Opinion in PCT/US2011/000264 dated Apr. 19, 2011, 8 pages.

The Extended European Search Report in European Application No. 11744991.8 dated May 24, 2013, 7 pages.

"Intelligent walking stick", authored by IBM Corporation, published by ip.com, dated Aug. 29, 2006, 2 pages.

* cited by examiner

WALKING DEVICE WITH PICK UP MECHANISM

FIELD OF INVENTION

The present invention is generally related to an improved walking device, such as a walking cane or a crutch, with a pick up mechanism that enables the device to be easily picked up when dropped on the ground.

BACKGROUND OF THE INVENTION

Presently, many people use devices such as walking canes or crutches to facilitate their movement. Walking canes and crutches can fall to the ground or be dropped by the user, or can fall from any given place of rest. Once they fall on the ground, it could be very challenging for the user to pick them up, because this requires the user to bend over to reach the ground. Normally, those who require a walking cane or a crutch to move around are those with compromised or impaired physical conditions. Bending over to reach the ground could be very difficult for them, if not impossible.

There have been some attempts to solve this problem. For example, U.S. Pat. Nos. 5,826,605, 6,039,064, and 6,068,007 disclosed a design which uses a series of complicated mechanicals to raise an arm when a cane or crutch falls on the ground. The draw back of this design is that it is too complicated, involves too many mechanical parts, and may not be very reliable. Another attempt to solve this problem is described in the paper "Intelligent walking stick". This paper disclosed a walking stick with three prongs that can open up similar to the spokes on an umbrella. The opening up mechanism is based on voice command. When the user speaks a phrase which matches a prerecorded voice signature, the three prongs are opened, resulting in two prongs touching the ground and raising the cane, and the third prong sticking in the air for the user to pick up. This design requires sophisticated voice recognition, which may not work very well in a noisy environment, such as in the streets or in a shopping plaza. Moreover, this design requires three prongs to be installed on a walking device, which complicates the design of the walking device. Yet another attempt to solve the problem is described in U.S. Pat. Nos. 8,387,638, 8,490,637, 8,689,811, and in U.S. patent publication US20210045508. These patent documents described a number of design alternatives that are improvements over the previous designs. However, they also have their own limitations.

Therefore, there is a need for an improved device to facilitate the convenient retrieval of a walking cane or a crutch that is dropped or falls on the ground.

DETAILED DESCRIPTION OF POSSIBLE EMBODIMENTS OF THE INVENTION

Possible embodiments of the invention are discussed in this section.

According to one embodiment of the present invention, an improved walking device is presented. This walking device could be a walking cane, a crutch, or any other devices that assist in walking. A sensor is incorporated into the walking device. The sensor senses an orientation of the walking device. The orientation sensor could be an accelerometer or a rate sensor such as a gyroscope. A power source and a power source connector are also incorporated into the walking device which supplies power to the sensor. At least one movable arm is attached to the walking device. The movable arm can rotate on the walking device. When the improved walking device according to one embodiment of the present invention falls onto the ground, the orientation sensor such as an accelerometer senses an orientation of the elongated body of the walking device, for example horizontal to the ground or vertical to the ground. If the sensed orientation is approximately horizontal to the ground within a range, it suggests that the walking device is likely dropped, then the sensor would produce electronic signal(s) to cause the rotation of a releaser such as a push pin or a trigger. The releaser can push away a locking device that locks the movable arm in place, the releasor further nudges the movable arm away from a resting position to enable it to raise up. Once the movable arm raises up, the walking device's user can grab it without having to bend too much, thus making it fairly easy for the walking device to be picked up.

According to another embodiment of the present invention, once the walking device is on the ground, the orientation sensor can sense whether the walking device is lying on its right side or left side. The orientation sensor will produce electronic signal(s) accordingly which will cause a release structure such as a push pin to rotate in the correction direction. The push pin pushes a latch structure such as a latch plate to unlock a wand hub wheel. The push pin then nudges a pick up wand to rotate away from its resting position by nudging the wand hub wheel to rotate. As the pick up wand rotates away from its resting position, a pull spring gains authority on the rotational torque and pulls the wand hub wheel and the pick up wand to a full deployed position. The pick up wand is typically parallel with the body of the walking device. When the walking devices lies on the ground, the wand would be approximately parallel with the ground. Once it rotates about 90 degrees, the far end of the wand would be a couple of feet above the ground, depending on the length of the wand. It would be fairly easy to pick up the walking device by grabbing the distal tip of the wand.

Figure 1:
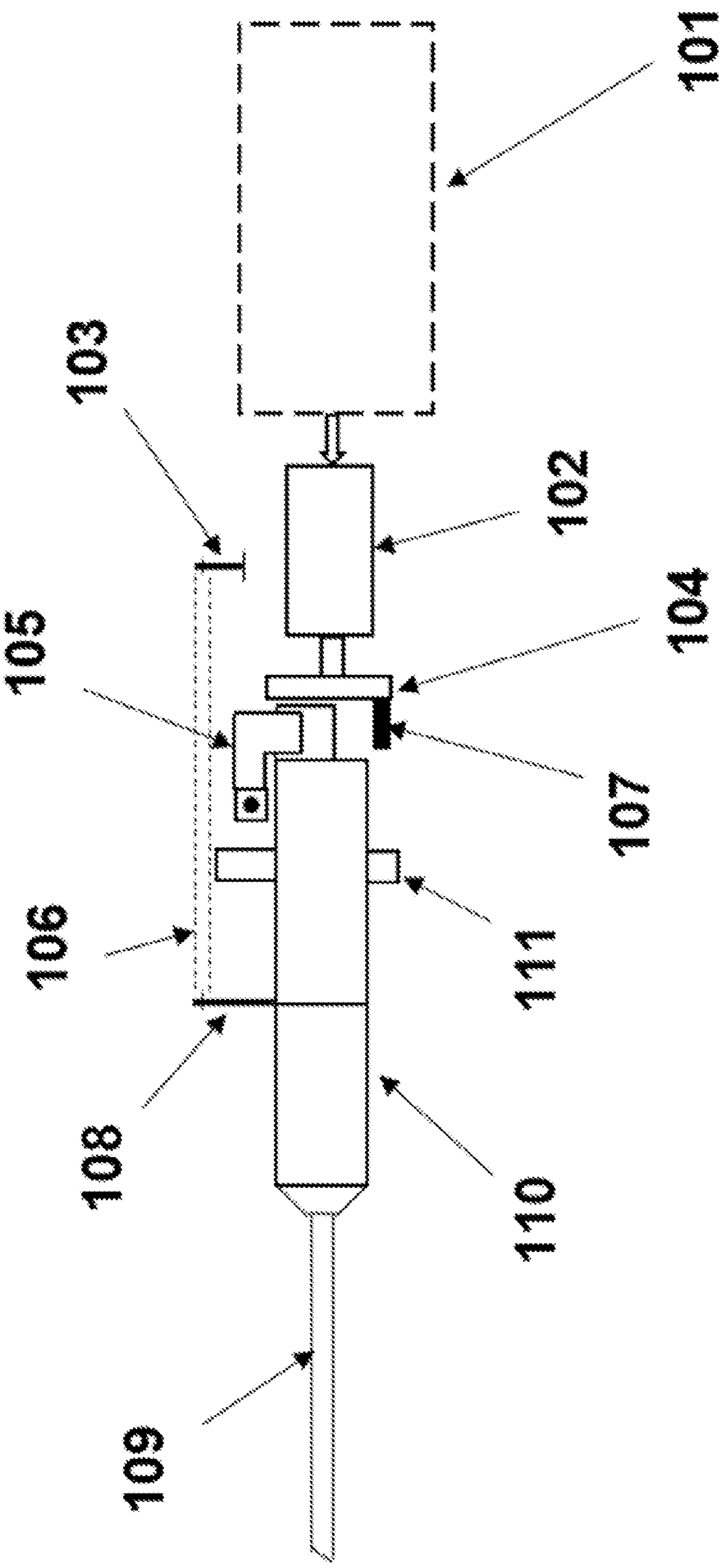
FIG. 1 is a side view of the pick up assembly of one embodiment of the invention.

FIG. 1 is a side view of the pick up assembly of one embodiment of the invention. According to this embodiment, the assembly includes a control board 101 which controls a motor 102. The motor has a pin wheel 104 attached to it, and the pin wheel 104 is attached to a release pin 107. The assembly also includes a wand hub 110. A wand 109 is attached to the wand hub 110. The wand hub 110 can rotate around a main shaft 111. A latch plate 105 is included in the assembly to lock the wand hub 110 in its resting position. The assembly also includes a pull spring 106, a hub spring pin 108 and a fixed spring pin 103.

According to one embodiment of the present invention, control board 101 includes an orientation sensor and a microprocessor. If the orientation sensor senses that the walking device to which the pick up assembly is attached has fallen and is within allowable tilt limits, it will produce a signal and the signal goes to the microprocessor. The microprocessor controls motor 102 to rotate a pin wheel 104. According to one embodiment of the present invention, the orientation sensor senses which side of the walking device is on the ground and produces a different signal accordingly. The microprocessor controls the motor 102 to rotate pin wheel 104 in two different directions (such as clockwise and counterclockwise) based on the different signals.

The release pin 107 is attached to the pin wheel 104. When pin wheel 104 rotates, it will drive release pin 107 to rotate. When the release pin 107 rotates to the upside, it pushes up a latch plate 105. The latch plate 105 normally locks wand hub 110 in place so that it cannot freely rotate. When latch plate 105 is pushed up and releases the wand hub 110, wand hub 110 can freely rotate around a main shaft 111. After pushing up the latch plate 105, release pin 107 further rotates to nudge wand hub 110 to rotate. Because pin wheel 104 can rotate in two different directions depending on which side the walking device to which the pick up assembly is attached has fallen onto, release pin 107 can also rotate in two different directions, and therefore can nudge wand hub 110 to rotate in two different directions. Because wand 109 is connected to wand hub 110, when release pin 107 nudges wand hub 110 to rotate, it also nudges wand 109 to rotate.

According to one embodiment of the present invention, the hub spring pin 108 is attached to wand hub 110. The fixed spring pin 103 is attached to the pick up assembly. Pull spring 106 is attached to the hub spring pin 108 and the fixed spring pin 103. Once wand hub 110 is nudged to rotate off its central position, pull spring 106 will quickly gain authority on the rotational torque and pulls wand hub 110 in one direction or another depending on in which direction wand hub 110 is nudged to rotate. Wand 109 is attached to wand hub 110. When wand hub 110 is pulled by pull spring 106 to a deployed position, it also rotates wand 109 to the deployed position.

According to another embodiment of the present invention, the assembly senses with a sensor that the pin wheel 104 continues to rotate the release pin 107 to a predetermined position, for example the original position from where it started the rotation, and then stops the pin wheel 104 from further rotating. According to yet another embodiment of the present invention, a magnet is attached to the gearmotor assembly and rotates in sync with the release pin 107. A magnet sensor is attached to the control board 101. The assembly senses the position of release pin 107 by sensing the position of the magnet with the magnet sensor.

Figure 2:
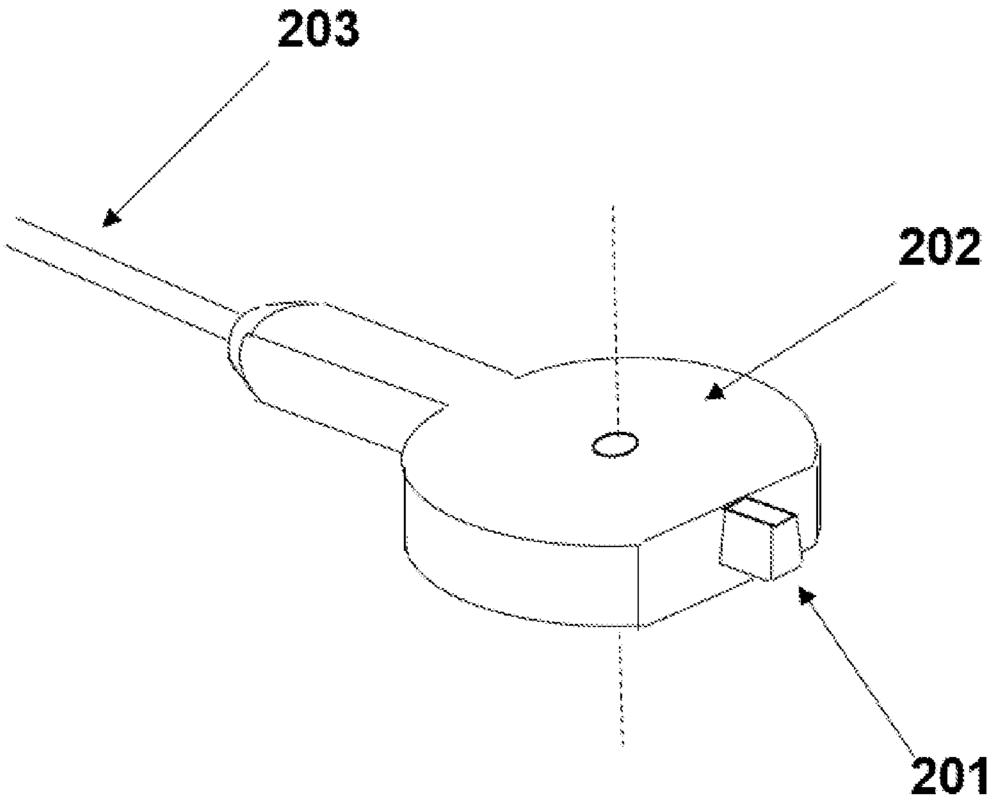
FIG. 2 is a perspective view of the wand hub assembly of one embodiment of the invention.

FIG. 2 is a perspective view of the wand hub assembly of one embodiment of the invention. A wand 203 is attached to the wand hub 202. A locking structure such as locking post 201 is attached to one end of wand hub 202. The locking post 201 is used to lock wand hub 202 into its resting position. When wand hub 202 is in its resting position, wand 203 is also in its resting position.

Figure 3:
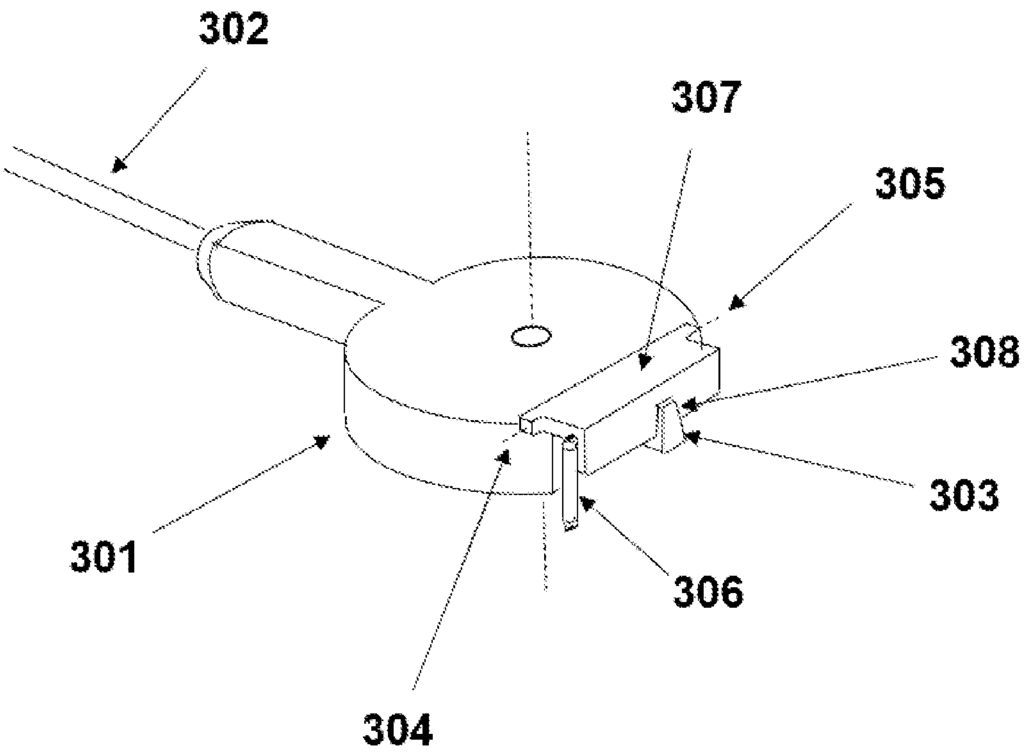
FIG. 3 is a perspective view of the wand hub assembly with a latch plate of one embodiment of the invention.

FIG. 3 is a perspective view of the wand hub assembly with a latch plate of one embodiment of the invention. Wand 302 is attached to wand hub 301. A locking post 303 is attached to one end of wand hub 301. A latch plate 307 is used to engage locking post 303. When latch plate 307 latches locking post 303 in place by holding it with a stopping formation 308, wand hub 301 is locked in place and cannot rotate, therefore wand 302 is also locked in place and cannot rotate. Latch plate 307 is attached to the pick up assembly by two pivot pins, left pivot pin 304 and right pivot pin 305. Latch plate 307 can rotate around these two pivot pins. When latch plate 307 is pushed away and releases locking post 303 from stopping formation 308, wand hub 301 becomes free to rotate and wand 302 can rotate with wand hub 301. A latch spring 306 is connected to latch plate 307 and provides a biasing force to urge a latch structure such as latch plate 307 to engage a locking structure such as locking post 303. When wand 302 and locking post 303 are in the locked position, latch spring 306 can hold latch plate 307 in the latched position. When latch plate 307 is moved away to release locking post 303, latch spring 306 can cause latch plate 307 to always maintain some amount of biasing force against locking post 303 as wand 302 deploys, this amount of force keeps latch plate 307 and locking post 303 engaging each other even when locking post 303 moves away from its locked position. When a user resets wand 302 to its locked position, latch spring 306 urges latch plate 307 back to its latched position and holds locking post 303 in place with stopping formation 308.

Figure 4:
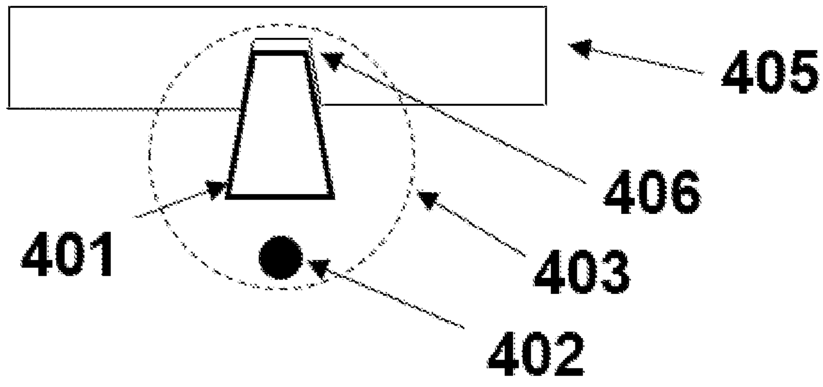
FIG. 4 is a side view of the locking system and release structure of one embodiment of the invention.

FIG. 4 is a side view of the locking system and release structure of one embodiment of the invention. According to this embodiment, release pin 402 is at its home position at the bottom. Release pin 402 is mounted on a pin wheel 403. Latch plate 405 engages locking post 401, and locks locking post 401 in place by holding locking post 401 with a stopping formation 406.

Figure 5:
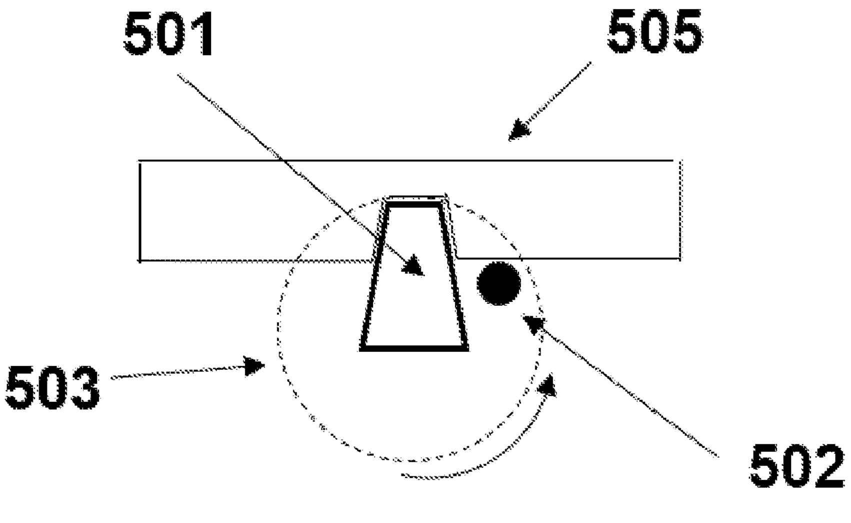
FIG. 5 is another side view of the locking system and release structure of one embodiment of the invention.

FIG. 5 is another side view of the locking system and release structure of one embodiment of the invention. According to this embodiment, release pin 502 is mounted on a pin wheel 503. By rotating pin wheel 503, the release pin 502 is rotated towards latch plate 505. Latch plate 505 engages locking post 501, and locks locking post 501 in place.

Figure 6:
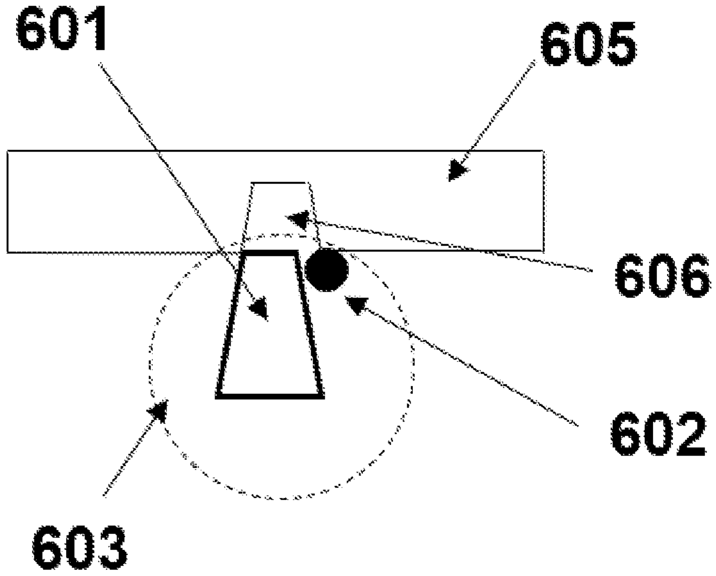
FIG. 6 is another side view of the locking system and release structure of one embodiment of the invention.

FIG. 6 is another side view of the locking system and release structure of one embodiment of the invention. According to this embodiment, release pin 602 is mounted on a pin wheel 603. By rotating pin wheel 603, the release pin 602 is rotated towards a latch plate 605, and pushes the latch plate 605 upward. By pushing away latch plate 605, locking post 601 is released from stopping formation 606 and is free to rotate.

Figure 7:
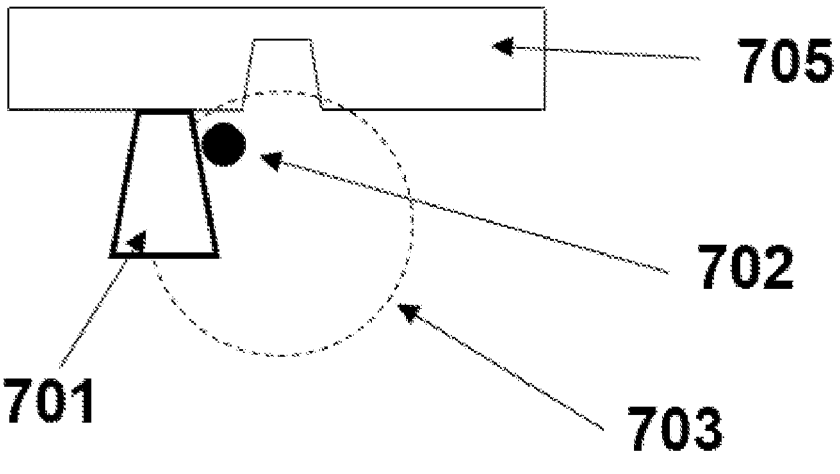
FIG. 7 is another side view of the locking system and release structure of one embodiment of the invention.

FIG. 7 is another side view of the locking system and release structure of one embodiment of the invention. According to this embodiment, release pin 702 is mounted on a pin wheel 703. By rotating pin wheel 703, the release pin 702 pushes up a latch plate 705, causing the latch plate 705 to release locking post 701 and allowing locking post 701 to move. By further rotating pin wheel 703 and release pin 702, release pin 702 nudges locking post 701 away from its resting position, thus nudging a wand that is connected to locking post 701 from its resting position. Pin wheel 703 can rotate in either direction, and therefore release pin 702 can rotate in either direction, and thus can push locking post 701 to rotate in either direction.

Figure 8:
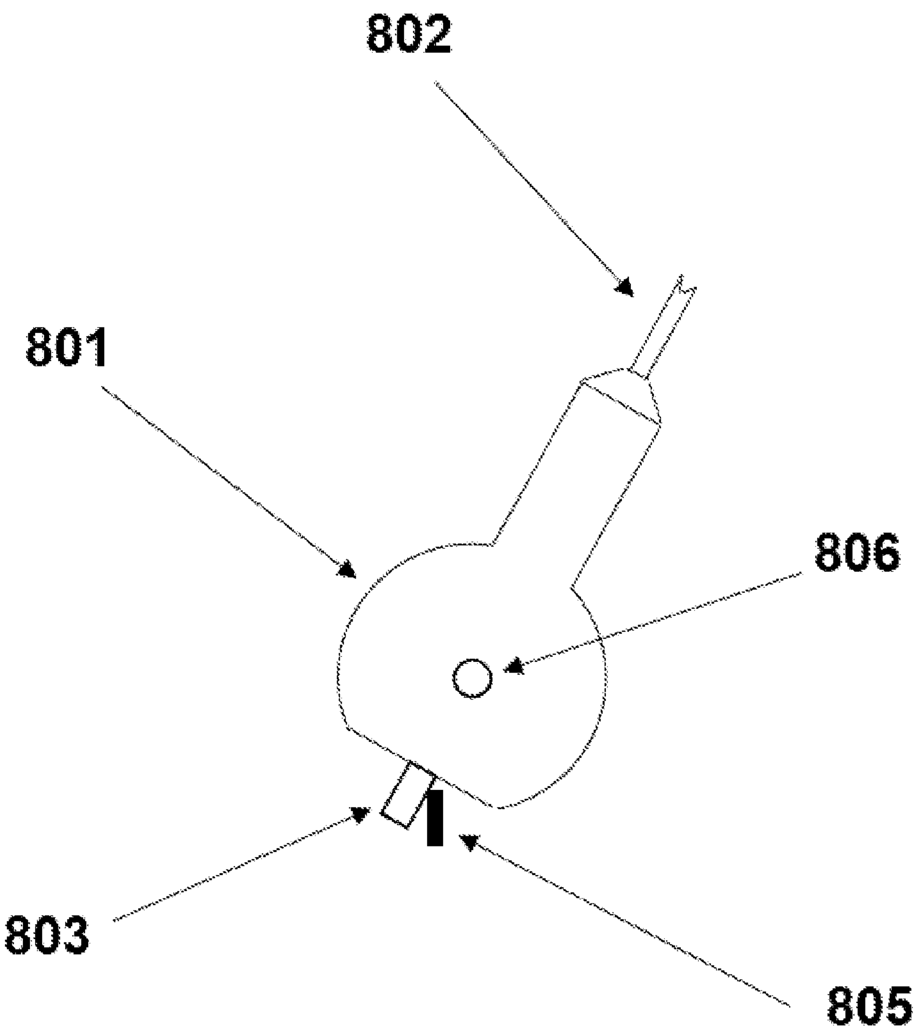
FIG. 8 is a top view of the wand hub assembly and the release pin of one embodiment of the invention.

FIG. 8 is a top view of the wand hub assembly and the release pin of one embodiment of the invention. According to this embodiment, wand hub 801 can rotate around a main shaft 806, wand 802 is attached to wand hub 801, so that when wand hub 801 rotates, wand 802 rotates together with wand hub 801. Locking post 803 is attached to wand hub 801. Release pin 805 is capable of pushing locking post 803 to cause it to rotate. When locking post 803 rotates, wand hub 801 also rotates.

Figure 9:
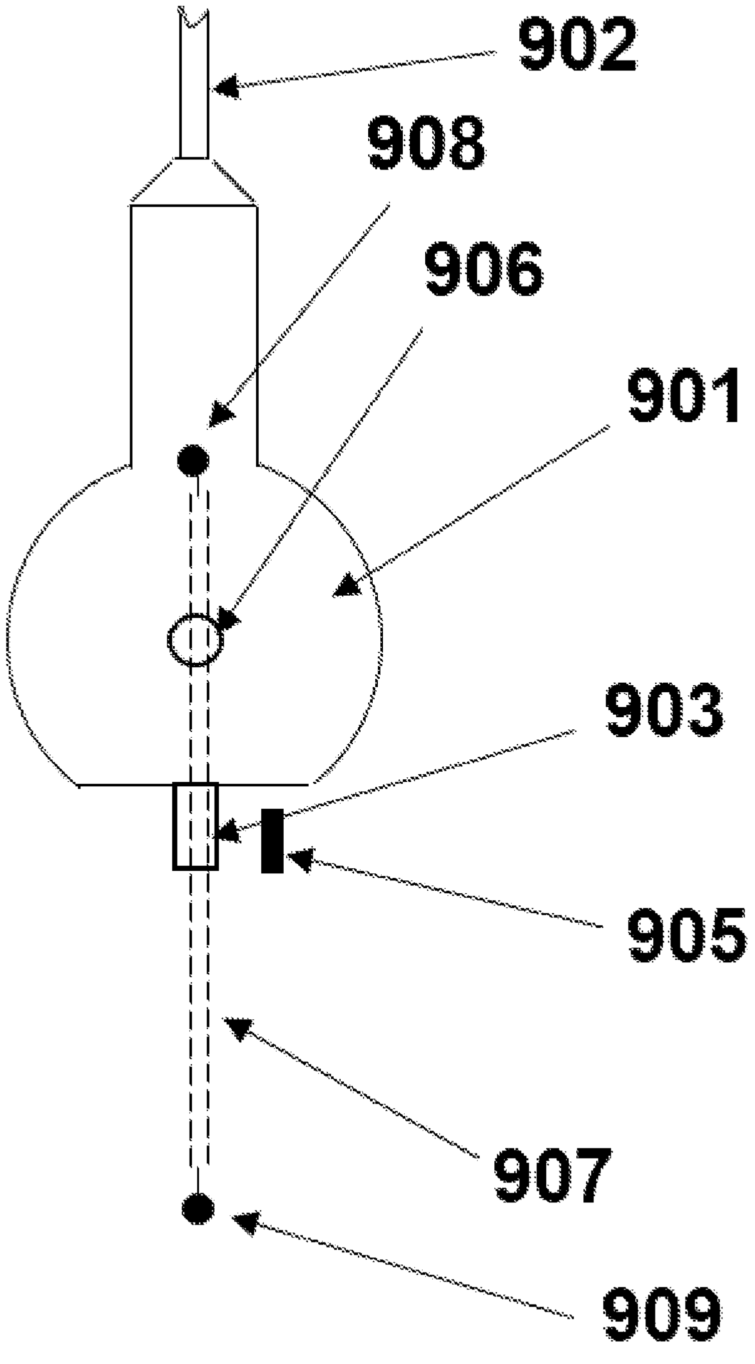
FIG. 9 is a top view of the wand hub assembly, the release pin and the pull spring of one embodiment of the invention.

FIG. 9 is a top view of the wand hub assembly, the release pin and the pull spring of one embodiment of the invention. According to this embodiment of the present invention, wand hub 901 can rotate around a main shaft 906. Wand 902 and locking post 903 are attached to wand hub 901 therefore they all rotate together. Pull spring 907 is attached to hub spring pin 908 and fixed spring pin 909. Hub spring pin 908 is attached to wand hub 901. Release pin 905 is at a position away from locking post 903. When the wand hub assembly is at a balanced position, pull spring 907 approximately goes through the wand hub assembly's central axis, and offers roughly no rotational forces either to the left or to the right.

Figure 10:
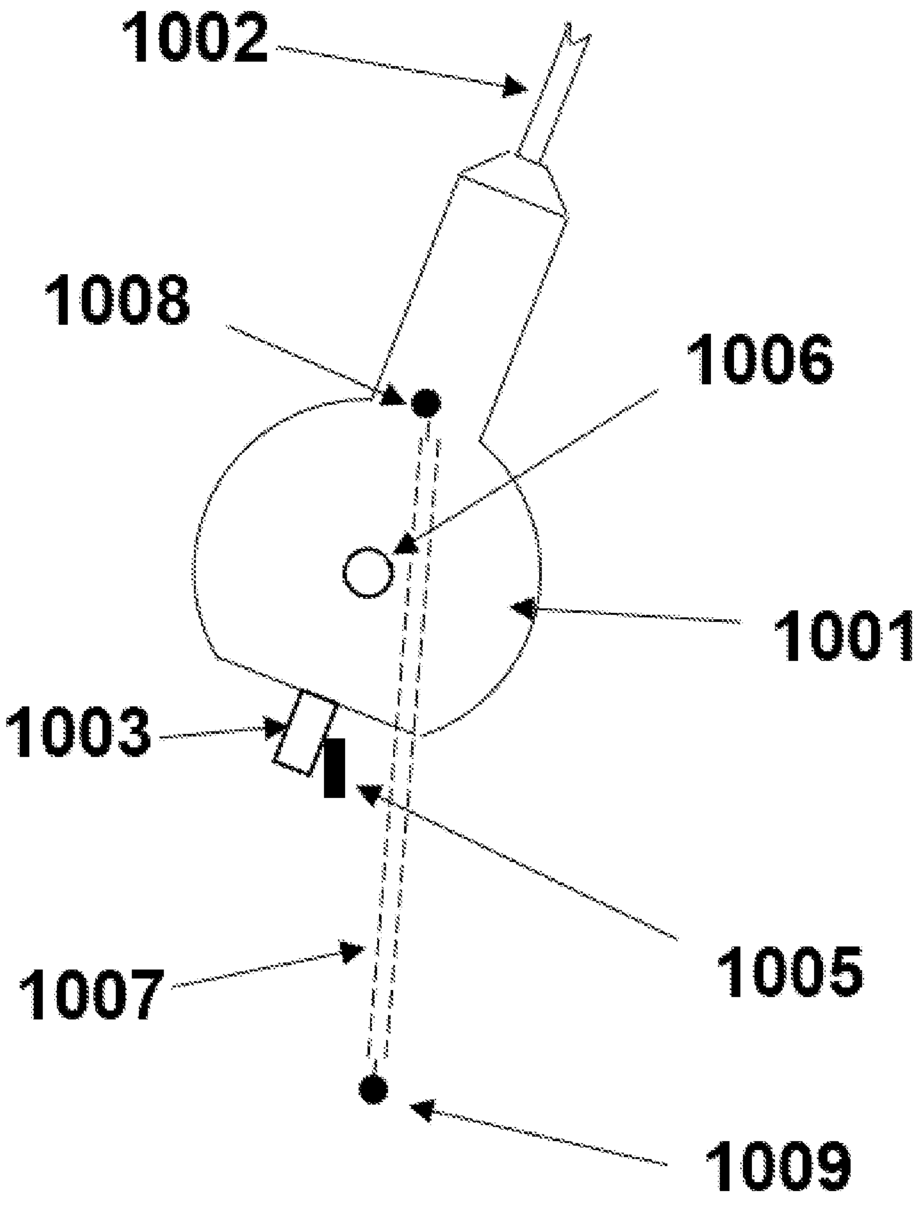
FIG. 10 is another top view of the wand hub assembly, the release pin and the pull spring of one embodiment of the invention.

FIG. 10 is another top view of the wand hub assembly, the release pin and the pull spring of one embodiment of the invention. According to this embodiment, wand hub 1001 can rotate around a main shaft 1006. Wand 1002 and locking post 1003 are attached to wand hub 1001 therefore they all rotate together. Pull spring 1007 is attached to hub spring pin 1008 and fixed spring pin 1009. Hub spring pin 1008 is attached to wand hub 1001. Release pin 1005 pushes against locking post 1003 causing it to rotate away from its resting position, and wand 1002 is also nudged away from its resting position by release pin 1005 because wand 1002 rotates together with locking post 1003. When locking post 1003 rotates, wand hub 1001 rotates with locking post 1003, and hub spring pin 1008 rotates with wand hub 1001. When hub spring pin 1008 moves away from its central position, pull spring 1007 begins to apply additional torque in the same rotational direction of wand hub 1001.

Figure 11:
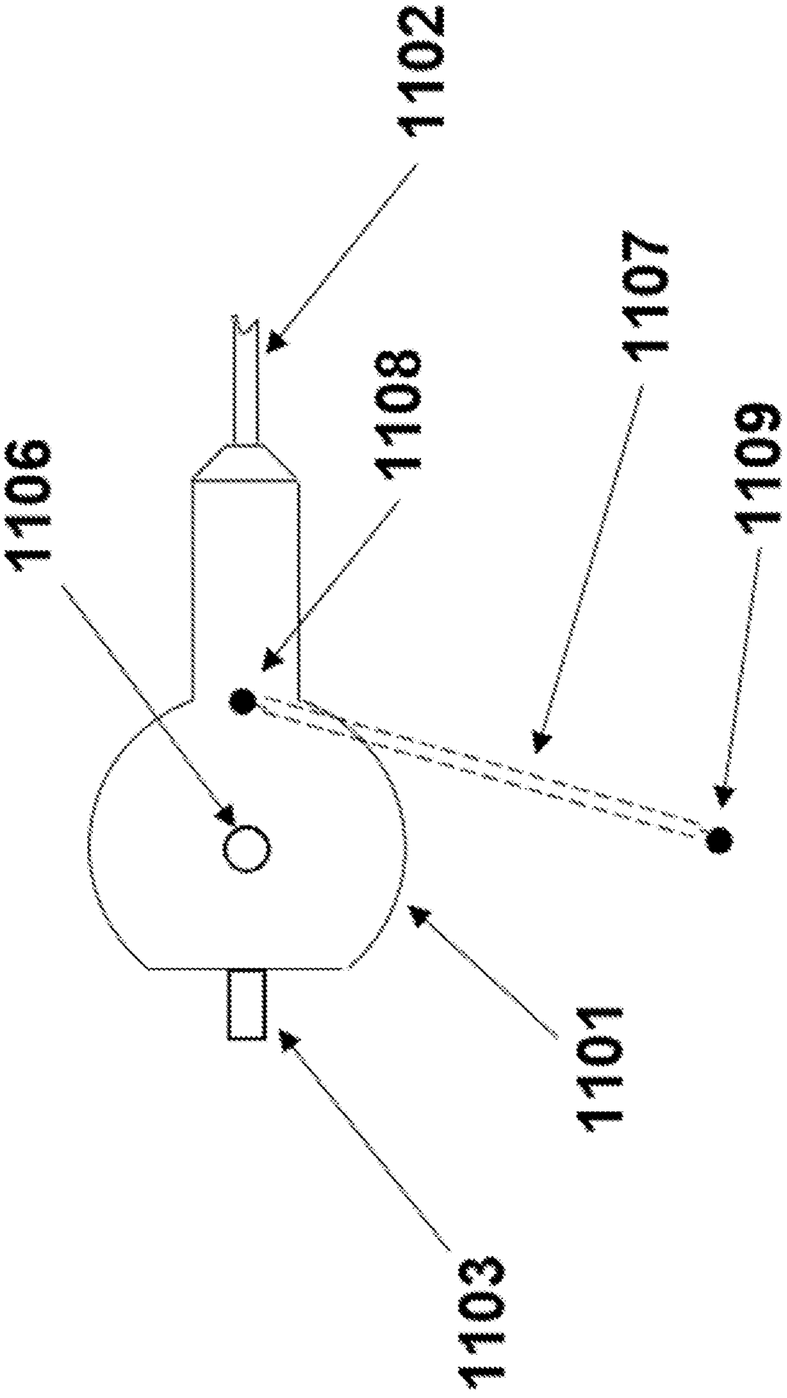
FIG. 11 is a top view of the wand hub assembly and the pull spring of one embodiment of the invention.

FIG. 11 is a top view of the wand hub assembly and the pull spring of one embodiment of the invention. According to this embodiment, wand hub 1101 can rotate around a main shaft 1106. Wand 1102 and locking post 1103 are attached to wand hub 1101. Pull spring 1107 is attached to hub spring pin 1108 and fixed spring pin 1109. Hub spring pin 1108 is attached to wand hub 1101. When hub spring pin 1108 rotates away from its central position, pull spring 1107 applies additional torque in the same rotational direction of wand hub 1101 and causes it to continue to rotate until it is stopped by a stop structure. Stop structure could be any physical structure that prevents wand hub 1101 or wand 1102 from further rotating. Wand 1102 is thus moved to a deployed position.

Figure 12:
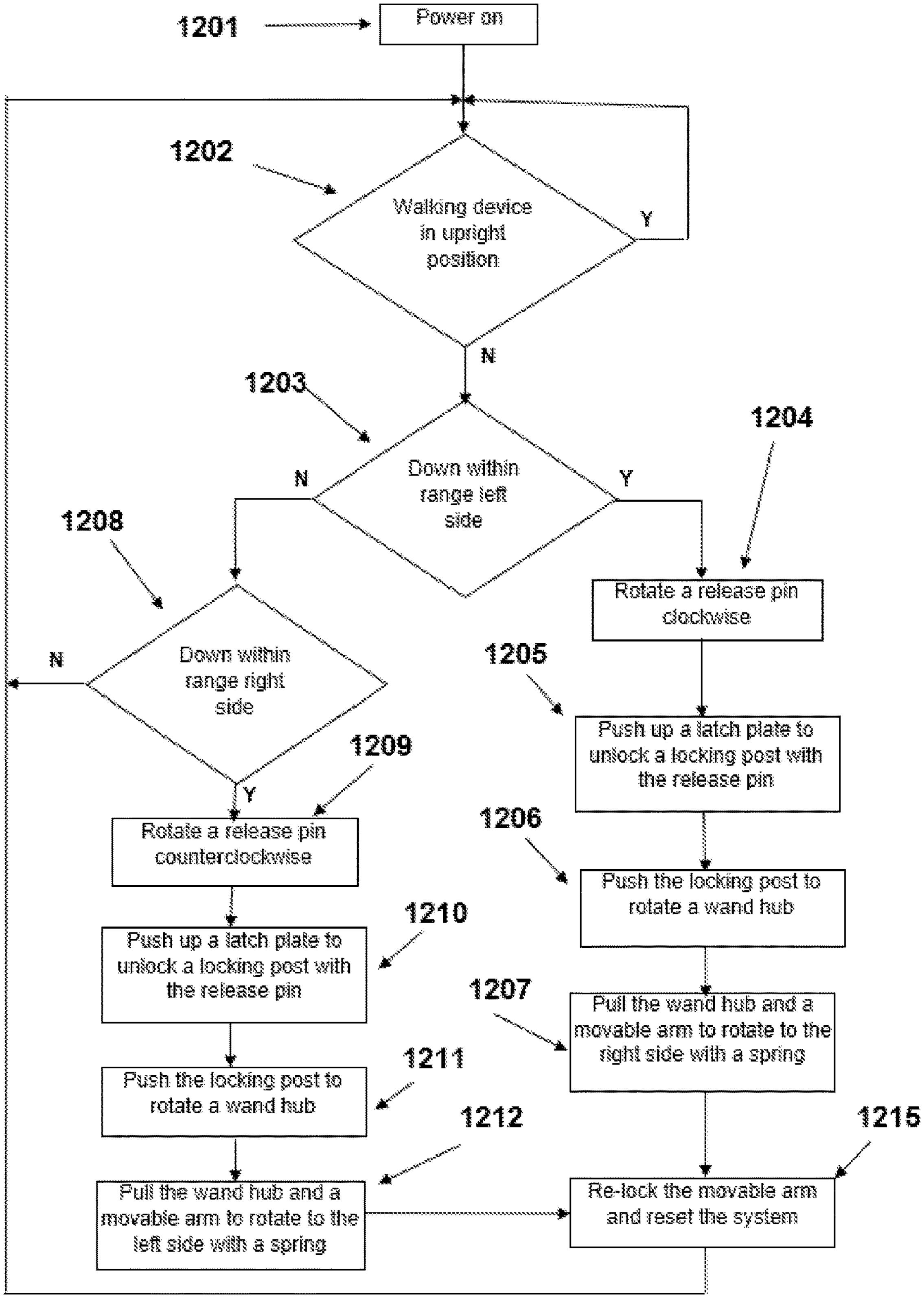
FIG. 12 is a flow chart showing illustrative steps that may be followed to perform the improved walking device functions in accordance with one embodiment of the invention.

FIG. 12 is a flow chart showing illustrative steps that may be followed to perform the improved walking device functions in accordance with one embodiment of the invention. According to this embodiment, the user turns on a power source at step 1201. The power source supplies power to a control system through a power source connector. The system includes a microcontroller or microprocessor, an orientation sensor that senses the orientation of a walking device, a memory that stores a software program executable by the microprocessor, a motor, a latch plate, a gear, a locking post, a release pin, and a spring. At step 1202, the orientation sensor sends electronic signals to the microprocessor which indicate whether the walking device is in an upright position or not. Microprocessor receives these electronic signals and decides next steps. If the walking device is in an upright position, then the process loops back. If the walking device is not in an upright position, at steps 1203 and 1208, the system determines based on the signal produced by the orientation sensor if the walking device is relatively parallel to the ground within a certain range, for example within 30 degrees from a horizontal position. The range can be more or less than 30 degrees, it can be set with the software program. To set a range is to account for the situation where the ground may not be level, or the walking device may be resting on an object on the ground, such as a stone or a box. The system also determines based on the signal produced by the orientation sensor if the walking device is lying on its left side or right side. If the walking device is not relatively parallel to the ground within a certain range, then the process loops back to step 1202.

If the walking device is down within a certain range, then depending on whether it is lying on its left side or right side, the process progresses to steps 1204 or 1209. At these steps, the system will rotate a release pin in the correct direction. At steps 1205 and 1210, the release pin pushes up a latch plate to unlock a locking post, the locking post is connected to a wand hub. At steps 1206 and 1211, the release pin further rotates and pushes the locking post to rotate, and therefore rotates the wand hub connected to the locking post. At steps 1207 and 1212, a spring pulls the wand hub to rotate further until it reaches a deployed position. A movable arm is connected to the wand hub. When the wand hub rotates to the deployed position, the movable arm is also rotated to the deployed position. The spring pulls the wand hub and the movable arm to either the right side or to the left side depending on which side the walking device is lying on. If the walking device is lying on its left side, the movable arm will be pulled to rotate to its right side. If the walking device is lying on its right side, the movable arm will be pulled to rotate to its left side. Once the walking device is picked up by the user, then at step 1215 the user re-locks the movable arm by pushing it back to its locked position and the system resets. The process then loops back to step 1202. The above mentioned steps represent just one embodiment of the present invention. Different steps or different orders of the steps can be performed to achieve similar results.

It is obvious that there are numerous different variations and combinations of the above described embodiments of the invention. All these different variations, combinations and their structural or functional equivalences are considered as part of the invention. The terms used in the specification are illustrative and are not meant to restrict the scope of the invention. The described methods have steps that can be performed in different orders and yet achieve similar results. All the variations in the design components or orders of the method steps are considered as part of this invention as long as they achieve substantially the same results.

The invention is further defined and claimed by the following claims.

We claim:

1. A device comprising:

an elongated body;

a movable arm coupled to the elongated body;

a power source connector;

a first sensor;

a releaser;

a first spring;

a locking system;

a gear;

wherein the first sensor is capable of detecting an orientation of the device and producing an electronic signal based on the orientation, wherein the electronic signal is capable of at least partially causing a movement of the releaser, wherein the releaser is capable of nudging the movable arm away from a resting position, wherein the first spring is capable of causing the movable arm to rotate to a deployed position, wherein the locking system comprises a latch structure and a locking structure, wherein the latch structure is capable of keeping the locking structure in a locked position, wherein the locking structure is connected to the movable arm in a way that they rotate together, wherein the releaser is attached to the gear and is capable of freeing the locking structure from the locked position.

2. The device of claim 1, wherein the latch structure comprises a stopping formation which is capable of engaging the locking structure.

3. The device of claim 1, further comprising a second spring, wherein the second spring is connected to the latch structure and is capable of providing a biasing force to urge the latch structure to engage the locking structure.

4. The device of claim 1, further comprising a motor, wherein the motor is capable of driving the gear and the gear is capable of driving the releaser.

5. The device of claim 1, further comprising a second sensor which is capable of sensing a position of the releaser.

6. A module for attaching to a device comprising:

a movable arm;

a power source connector;

a first sensor;

a releaser;

a first spring;

a locking system;

a gear;

wherein the first sensor is capable of detecting an orientation of the module and producing an electronic signal based on the orientation, wherein the electronic signal is capable of at least partially causing a movement of the releaser, wherein the releaser is capable of nudging the movable arm away from a resting position, wherein the first spring is capable of causing the movable arm to rotate to a deployed position, wherein the locking system comprises a latch structure and a locking structure, wherein the latch structure is capable of keeping the locking structure in a locked position, wherein the locking structure is connected to the movable arm in a way that they rotate together, wherein the releaser is attached to the gear and is capable of freeing the locking structure from the locked position.

7. The module of claim 6, wherein the latch structure comprises a stopping formation which is capable of engaging the locking structure.

8. The module of claim 6, further comprising a second spring, wherein the second spring is connected to the latch structure and is capable of providing a biasing force to urge the latch structure to engage the locking structure.

9. The module of claim 6, further comprising a motor, wherein the motor is capable of driving the gear and the gear is capable of driving the releaser.

10. The module of claim 6, further comprising a second sensor which is capable of sensing a position of the releaser.

* * * * *